Dec. 23, 1952 M. BONNET 2,622,472
APPARATUS FOR RELIEF AND MOVEMENT PHOTOGRAPHY
Filed Feb. 26, 1948 2 SHEETS—SHEET 1
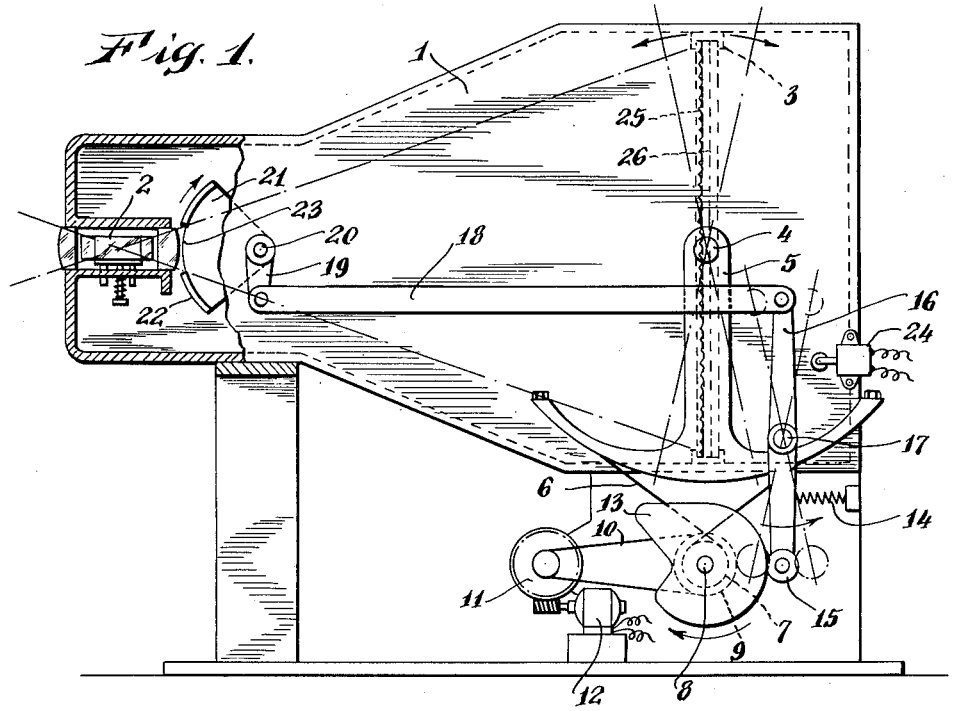
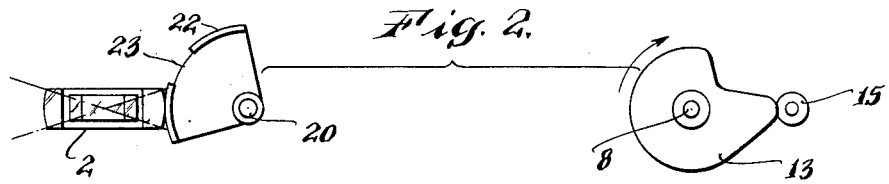
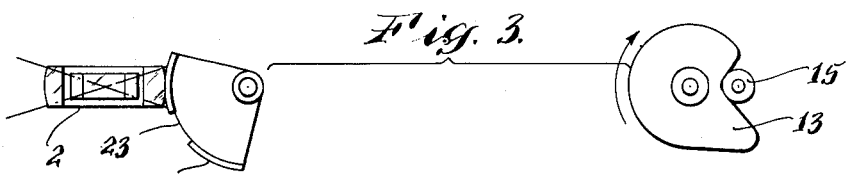
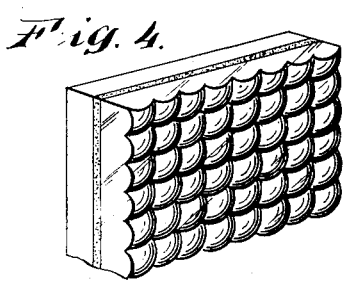
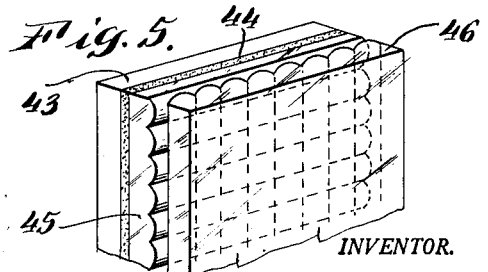
INVENTOR.
Maurice Bonnet
BY Haseltine, Lake + Co.
AGENTS.

Dec. 23, 1952 — M. BONNET — 2,622,472
APPARATUS FOR RELIEF AND MOVEMENT PHOTOGRAPHY
Filed Feb. 26, 1948 — 2 SHEETS—SHEET 2

INVENTOR.
Maurice Bonnet
BY Haseltine, Lake & Co
AGENTS.

Patented Dec. 23, 1952

2,622,472

UNITED STATES PATENT OFFICE 2,622,472

APPARATUS FOR RELIEF AND MOVEMENT
PHOTOGRAPHY

Maurice Bonnet, Paris, France, assignor to La
Reliephographie, Société pour l'Exploitation
des Procedes de Photographie en Relief Maurice
Bonnet, Paris, France, a French corporation Application February 26, 1948, Serial No. 11,116
In France May 25, 1946

Section 1, Public Law 690, August 8, 1946
Patent expires May 25, 1966

7 Claims. (Cl. 88—16.6)

In my prior application Ser. No. 746,748, filed May 8, 1947, entitled "Improvements in and relating to static apparatus for instantaneous relief photography," now Patent 2,573,242 issued October 10, 1951, I have described and shown an arrangement comprising in particular a rigid camera or photographic chamber provided with an objective lens of large aperture combined with a horizontal row of optical inversion elements.

The purpose of the present invention is to provide means which make it possible to transform this arrangement into apparatus enabling photographs to be obtained both in relief and in motion.

For this purpose, the optical selector with vertical cylindrical lenticular elements used in the previous arrangement is replaced either by an optical selector with spherical lenticular elements or by a double selector formed by the superposition of two selectors with cylindrical lenticular elements intersecting at 90°.

According to the invention, means are provided which make it possible to impress on the registering selector (selectograph) thus formed a suitable movement of vertical selection, so as to be able to register in succession on the same negative a series of different aspects of the subject photographed in relief. These registrations of successive different images, superposed vertically in the photo-sensitive layer, are naturally limited by the aperture angle of the lenticular elements of the selector which are acting in the vertical direction.

The invention thus concerns means whereby the vertical image-lines obtained by the use of a selectograph with cylindrical lenticular elements, such as that mentioned in the above patent application, are themselves fractioned into a series of image-points, each horizontal row of these image-points constituting the elements of a new image in relief.

The apparatus which is the particular subject of this invention consists of a combination of static means for still photography in relief with kinematic means for motion photography, this combination rendering possible the construction of apparatus of very great simplicity.

The apparatus also concerns different embodiments of the photographs obtained by means of the apparatus thus formed. It is known that optical selectors are capable of being used in two different ways: with parallactic selection, and with selection by sliding. In the first case, the group consisting of the sensitive surface and the selector turns about an axis which lies in the plane of the sensitised surface, so as to vary progressively the angle of incidence of the light rays that strike the selector. In the second case, the selector slides against the sensitive surface during the registering by an amount equal to the width of its lenses.

In the explanation which follows there will be described by way of example two forms of construction of apparatus for relief and motion photography using the parallactic method of selection, but it is clear that the invention is just as applicable to apparatus constructed in a known manner to function according to the principle of selection by sliding.

In the accompanying drawings:

Figure 1 is a side view in section, of an apparatus constructed in accordance with the invention.

Figure 2 is a diagrammatic view of the shutter control members at one of their end positions.

Figure 3 is a corresponding view showing the same members at their other end position.

Figure 4 shows in perspective a relief and movement photograph part comprising an optical selector with spherical lenses.

Figure 5 shows in the same way a relief and motion photography component comprising a double optical selector with crossed cylindrical lenticular elements.

Figure 6:
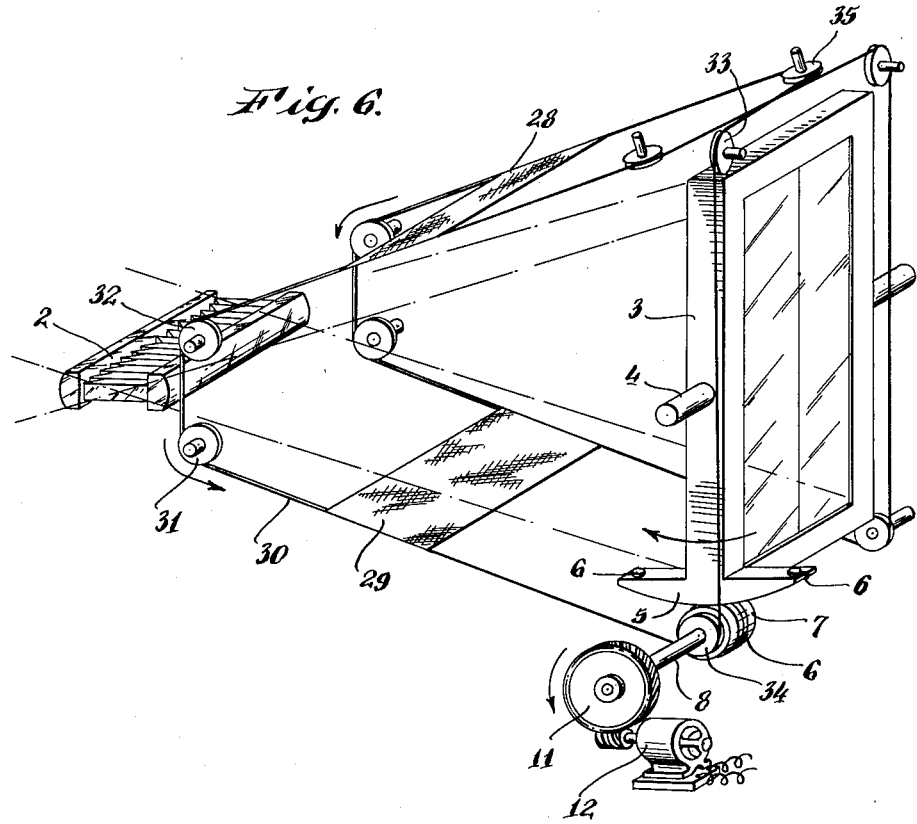
Figure 6 shows in perspective a second constructional form of the apparatus.

All these figures have been drawn without regard to scale or proportion in order to make them clearer.

In Figure 1, I is the camera or photographic chamber comprising the special objective combined with inversion elements described in the above mentioned specification. This objective is denoted as a whole by 2. 3 denotes the frame carrying the selectograph and the negative, pivoting about horizontal pivots 4. A quadrant 5 is fixed to the frame 3, the centre of this quadrant being at 4, and to both of its ends is fastened a cable or a belt 6 passing round a pulley 7, keyed to a horizontal shaft 8, which also carries another pulley 9, connected by a belt 10 to a speed-reduction gearing 11, driven by an electric motor 12 for instance.

The horizontal shaft 8 also carries a cam 13, against which is pressed, under the action of a spring 14, a roller 15, pivotally mounted at the end of a double-armed lever 16, which swings about a fixed pivot 17 parallel to the pivots 4 and 8. To the other end of the double-armed lever 16 is articulated a link 18, which actuates a lever 19, keyed to a pivot 20 parallel to the pivot 4. To the two ends of this shaft 20 are fixed quadrants 21 supporting a cylindrical shutter 22, the opening of which is denoted by 23. A switch 24 for the end of the travel is provided to cut off the supply of current to the electric motor 12 when the double-armed lever 16 has carried out the requisite displacement.

The working of this arrangement is as follows:

The moving parts of the apparatus occupy the positions shown in Figure 1, the apparatus operating in exactly the same manner as that described in the patent application mentioned above. The only difference consists in the fact that as the selectograph 25, which precedes the photo-sensitive surface 26, operates both in the vertical direction and in the horizontal direction, the series of vertical image-lines which would have been obtained in the preceding apparatus is replaced in this case by a series of points, regularly distributed over the photo-sensitive surface.

Such a registering, inspected through an optical selector with vertical cylindrical lenticular elements, will give an image of the subject photographed in relief, which will be exactly identical with that obtained in the first apparatus.

When the electric motor 12 is set in motion, the pulley 7, by acting on the quadrant 5, produces the rotation of the frame 3 about the shaft 4. Owing to this, fresh horizontal series of image-points are formed in the parts of the photo-sensitive emulsion left untouched by the first registering, each horizontal row of these image-points forming the elements of a new photograph of the subject in relief. If the latter moves during the photographing, each of these horizontal rows will give a different image of the subject but always in relief, corresponding to each of its successive appearances.

The movement of rotation of the frame 3 about the shaft 4 being continuous, and the shutter 22 remaining open during the registering, these horizontal rows of image-points are united on the negative 26, but they exist none the less, and they are found again on inspection of the image through the observation selector (selectoscope). It is obvious that this movement of registering of the relief must be interrupted when all the horizontal bands of photo-sensitive emulsion which correspond to the angle of opening of the lenses of the screen have been covered by the image-points progressively formed in the photo-sensitive emulsion. This is the moment when the roller 15 has arrived at the end of the circular part of the cam 13. When this roller is actuated by the projection of the cam, which turns in the direction shown by arrows in Figures 1, 2 and 3, it is displaced towards the right in Figure 1, thus producing a displacement of the link 18 and of the cylindrical shutter 22, in the direction indicated by arrows. The enclosing of the lens is thus ensured, in the position shown in Figure 2.

At this moment, the double-armed lever 16 meets the end-of-travel switch 24, which cuts off the current supply to the electric motor 12. The whole of the arrangement is then immobilized, and the frame carrying the plate and the selector is disengaged from the frame 3, to be taken away for development.

Before carrying out the next exposure, the motor 12 is set in motion so that the roller 15 occupies the position shown in Figure 3, at which the shutter 22 is also closed.

It is clear that instead of using a rigid shutter with a cylindrical quadrant as shown, it would be quite as easy to use a curtain shutter, winding on two pulleys with horizontal axes, one of which would be rotated by means of suitable mechanism acting in a similar fashion to that shown in Figure 1.

Figure 6 shows a second form of construction of the invention using a curtain shutter 28, 29. In accordance with the invention, cables 30 to which this curtain is fixed traverse on the inside of the photographic chamber 1 a path which is closed in itself. They are guided for this purpose by pulleys 31, 32, 33, 34 and 35.

In order to ensure the parallel displacement of this curtain, the width of which is at least equal to that of the objective 2, and may be rather large, the cables 30 are crossed at the rear part of their course, as shown, with the help of return pulleys 35.

In accordance with the invention, the horizontal shaft 8 of one of the two sets of rear guide pulleys also carries the drum 7, on which is wound the cable 6, the two ends of which are fixed to the quadrant 5 centered on the horizontal shaft 4 of the frame 3, as in the apparatus shown in Figure 1. The shaft 8 is set in rotation for example by means of mechanical gearing 11 and a motor 12 similar to those described and shown in Figure 1. The opening of the curtain 28, 29 is of such a height that the aperture is closed by this curtain when the frame 3 has turned about the axis of the pivots 4 through an angle exactly equal to the angle of opening of the lenses of the selectograph which precedes the photo-sensitive surface.

The working of this second form of construction can be clearly seen from the figure, and does not require to be further explained in detail.

The invention also concerns various embodiments of motion photography in relief obtained by means of the apparatus described above, making possible the use of different positive and negative photo-sensitive surfaces, thus lending themselves to various applications.

In the patent application already mentioned, it has been stated that the objective 2 could be equipped with optical inversion elements ensuring the fractional turning of the image either in the horizontal direction only or both in the horizontal and in the vertical direction. To these two types of apparatus correspond different methods of printing which will now be explained, and which the invention equally concerns, and which are intended to produce "right" images, that is to say, images in agreement with the subject as regards the right-left directions.

Figure 7:
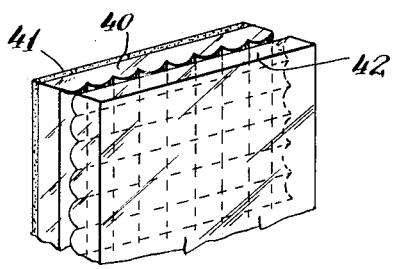
Figures 7 and 8 show other alternative forms of construction of relief and motion images produced in accordance with the invention.

When the apparatus is equiped with simple Wollaston prisms or with cylindrical afocal systems, ensuring the turning of the image in the horizontal direction only, and when the negative is formed by an ordinary photographic plate, upon which the impression has been made behind the selectograph, this cliché or negative is printed on a positive material formed by a selector screen or selectoscope 40 with vertical cylindrical elements (see Figure 7), carrying the photo-sensitive layer 41 on its plane face.

The effect of this printing process is to suppress the reversal of the image which is normally produced by the usual process of contact printing with emulsion against emulsion. The positive image which is united with this selectoscope with vertical cylindrical elements is then covered, lenses against lenses, by a second selectoscope 42 identical with the first, but with the cylindrical lenses horizontal. The two selectoscopes are then assembled, after adjustment, by any means for peripheral adhesion or framing.

If, on the other hand, the objective lens 2 of the apparatus comprises double inversion elements (roof-type Wollaston prisms or spherical afocal systems) effecting the fractional turning of the image in both directions at the same time, there is used as the positive surface, the impression of which is made by means of the same negative, an ordinary commercial diapositive plate 43, the photo-sensitive layer of which is denoted by 44 (see Figure 5). After development it is covered by a cylindrical lenticular screen 45, which is then united with this plate, after adjustment, by using any form of peripheral fixing. Upon this group is then placed, lenses against lenses, a second selectoscope 46, with cylindrical lenticular elements the lenses of which are at right angles to those of the first.

Figure 8:
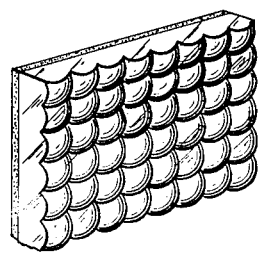

When selector screens with spherical elements are used, the two methods of printing indicated above will have to be used as the negative is formed by a commercial plate or by a selectograph carrying the photosensitive layer directly. Indeed, it is necessary to take into account the fact that ordinary printing by contact produces a lateral reversal of the image which does not take place in the method of printing which is the subject of the patent application mentioned above. A proof of this kind will have for example the appearance shown in Figures 4 and 8.

It is also possible according to the invention to obtain positive proofs which can be observed either by transparency or by reflection. In the latter case the positive will be constituted by a positive plate with a reflecting and diffusing back layer or by a selectoscope carrying directly on its back the positive photo-sensitive layer, covered after printing with a suitable reflecting and diffusing surface. In this case also it is necessary to take into account the conditions to be observed in the turning of the image.

Thus, by way of example, with apparatus comprising simple Wollaston prisms and a negative formed by a selectograph carrying the negative photo-sensitive layer directly, it will be necessary to use as positive a photo-sensitive surface supported independently of the selectoscope, in order to obtain a "right" image.

The relief photographs obtained in accordance with the invention become animated when the observer approaches or moves away from the image, or again when he is displaced vertically in front of it. As a matter of fact, owing to the selection used in the vertical direction, his visual rays progressively encounter, in the course of his movement, different horizontal rows of the image-points, showing him progressively changing aspects of the same subject. His two eyes perceive at the same time, owing to the selection used in the horizontal direction, two different angular aspects of the subject, so that the relief effect is maintained.

In all the preceding, the question has only been that of the progressive and continuous registering of the different aspects of the same subject in movement.

In accordance with the invention it is also possible to use the same apparatus for the successive discontinued registering, on the same negative, of different subjects which succeed each other before the objective lens.

For this purpose, it will be sufficient to modify in a suitable manner the shutter and the vertical selection control or actuation so as to ensure the covering of the objective lens and the stoppage of selection during the application of the subjects.

Such an application of the invention will make it possible to show in succession the different images in relief, registered according to the position occupied by the observer.

Having now particularly described and ascertained the nature of our said invention and in what manner the same is to be performed, I declare that what I claim is:

1. In an apparatus for recording relief moving pictures, the combination of an optical selector having lenticular elements curving about at least two mutually perpendicular axes, a lens, a negative plate and separate means for registering relief and movement, said screen being placed ahead of the negative plate in the direction of travel of the light rays coming from the lens, the means for registering relief comprising an objective lens of large diameter constituting the stereoscopic observation base, combined with a horizontal row of inversion elements adapted to effect fractional reversing of the image, said means being adapted to act upon the rays selected horizontally by the screen, the means for registering movement comprising a shutter having a vertically movable slot constituting the vertical base of registration and means for pivoting the negative plate and selecting screen about an horizontal transversal axis.

2. In the apparatus as claimed in claim 1, means for synchronizing said pivoting means with said shutter mechanism.

3. In the apparatus as claimed in claim 1, means for synchronizing the pivoting means with the shutter mechanism of the rigid semi-cylindrical pivoting type, comprising a motor, a cam actuated by said motor about an axis parallel with the pivoting axis of the screen and negative plate, a linkage between said cam and said shutter, a pulley on the axis of the cam, and a wire coiled on said pulley, both ends of the wire being connected to the ends of a beam fixed to the screen and plate frame.

4. In the apparatus as claimed in claim 3, a shutter mechanism comprising a cylindrical quadrant pivoting about an axis parallel to the pivoting axes of the cam and of the screen and plate.

5. In the apparatus as claimed in claim 1, a shutter mechanism of the curtain type having a vertically movable horizontal slot, and cables adapted to carry said shutter and to move around a closed circuit extending between the camera lens and negative plate, said circuit being defined by a plurality of return pulleys one of which, having a horizontal axis, being rigidly connected to a drum, a cable wound on said drum, a circular sector rotatable about said pivoting axis, and a frame rigid with said sector and adapted to carry said selecting screen and negative plate, the ends of said cable being connected to opposite sides of said sector.

6. An apparatus as claimed in claim 1 wherein the optical selector has spherical lenticulations.

7. An apparatus as claimed in claim 1 wherein the optical selector comprises two series of superposed cylindrical lenticular elements the axes of the elements of one series being at 90° to the axes of the other series.

MAURICE BONNET.

REFERENCES CITED

The following references are of record in the file of this patent:

UNITED STATES PATENTS

| Number | Name | Date |
|---|---|---|
| 1,935,471 | Kanolt | Nov. 14, 1933 |
| 1,950,374 | Kanolt | Mar. 6, 1934 |
| 1,984,004 | Wildhaber | Dec. 11, 1934 |

FOREIGN PATENTS

| Number | Country | Date |
|---|---|---|
| 590,853 | France | Mar. 26, 1925 |
| 618,880 | France | Dec. 21, 1926 |
| 31,761 | France | Feb. 1, 1927 |
| (First addition to 618,880.) | | |